Dec. 16, 1941.   R. D. CLEMSON   2,266,165
MOWER
Filed Feb. 14, 1939   2 Sheets-Sheet 1
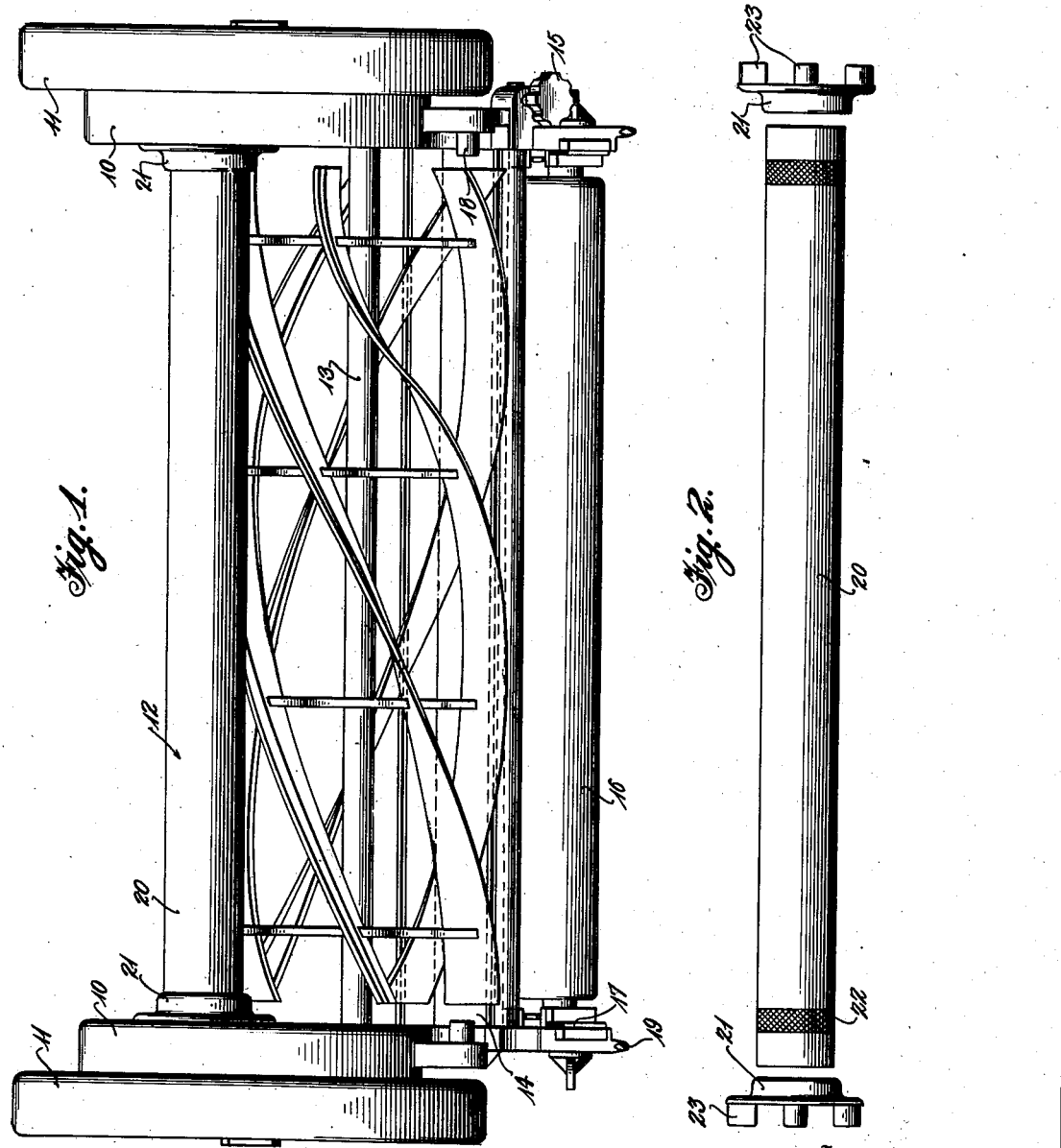
Inventor
Richard D. Clemson
By
Attorneys

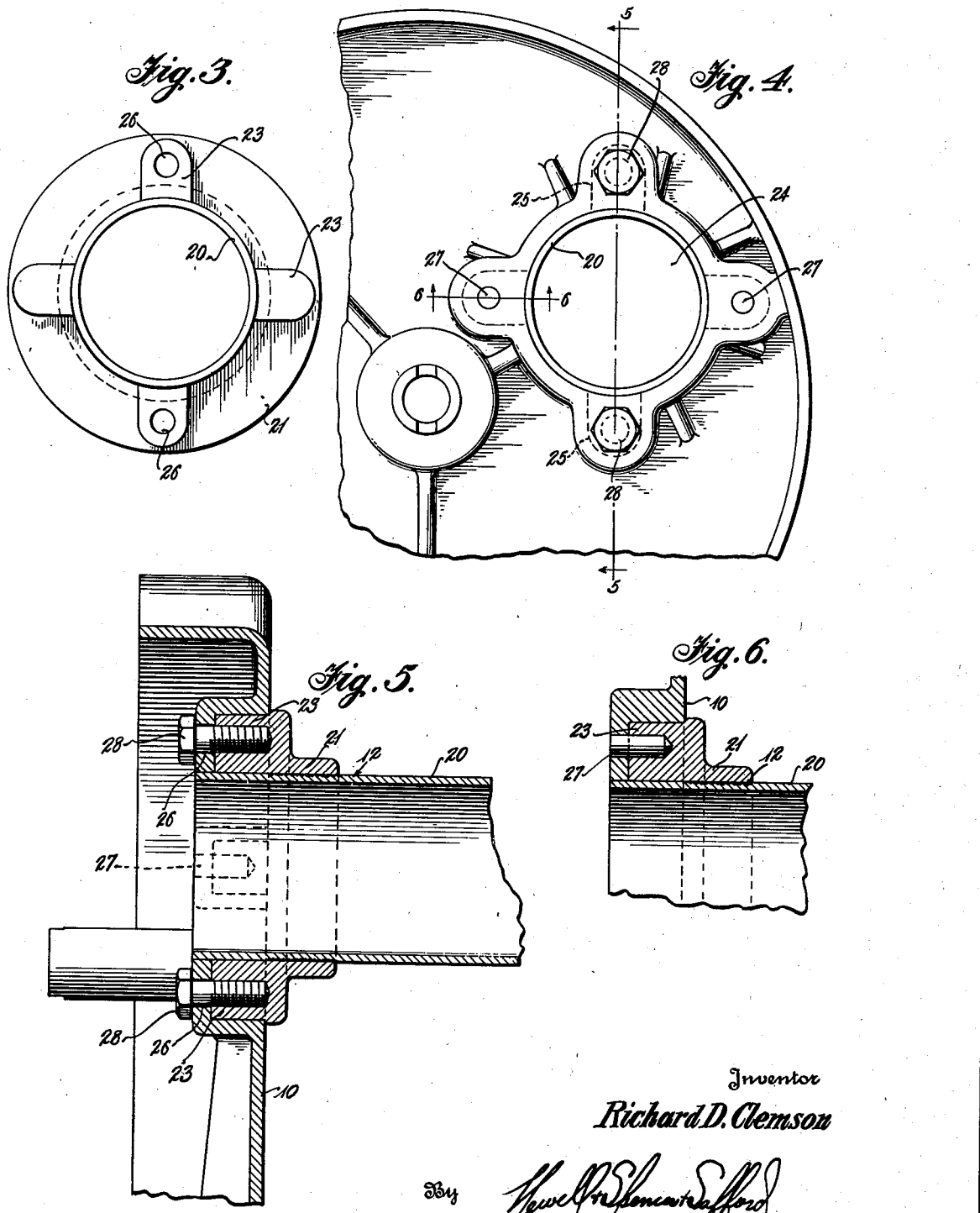

Patented Dec. 16, 1941

2,266,165

UNITED STATES PATENT OFFICE 2,266,165

MOWER

Richard D. Clemson, Middletown, N. Y., assignor to Clemson Bros., Inc., Middletown, N. Y., a corporation of New York Application February 14, 1939, Serial No. 256,378

2 Claims. (Cl. 56—249)

This invention relates to a method for constructing a lawn mower of the rotary cutting reel and bed knife type and to the lawn mower of improved characteristics constructed by that method.

In lawn mowers of the rotary reel type, rigidity of the frame is a highly desirable property but in actual practice that characteristic has not been heretofore achieved by reason of the fact that the mowing machine must be made to sell for a relatively low price. Consequently present lawn mowers are a compromise between the two requirements of rigid construction and low manufacturing cost. It has been common practice to mount the cutting elements (rotary reel and bed knife) on side frame members which were somewhat loosely connected by a thin tie rod, the reel axle and the bed knife, leaving enough chance for play in these parts so that after assembly and after wear during normal use variations in the size and shape of various parts can be absorbed in the usual opposed screw adjustment provided. Such an arrangement gives fairly satisfactory spacing of the said members but no positive provision is made for maintaining the connecting parts at right angles to the side frame members. A thin metallic rod threaded or otherwise attached to the side frame members has served as a tie rod. This part, as previously known to the art, flexed rather readily, thereby impairing the alignment of the wheels with respect to the handle. Both the reel and the bed knife are commonly mounted in bearings on the frame members. The bearing surfaces are not designed, and cannot ordinarily be designed, to resist distortion of the mower unit tending to impair the alignment or proper angular relation of the parts. It will be clearly seen that the proper member which can be adapted to offer sufficient resistance to distortion is the tie rod and as mowers are now constructed, that member offers but little resistance to distorting stresses.

In the use of a lawn mower in the nature of those now in common use, force applied by the handle is normally directed parallel to the wheel treads. However, the position of the handle cannot positively determine the direction of a propelling force and there are a number of situations in which the mower is subjected to distortion. In turning the machine, as at the corner of a lawn, the force applied to the handle has a component normal thereto. If the stand of grass, weeds or the like to be cut is uneven or the wheels rest on different types of surfaces or at different elevations, strains tending to distort the machine are exerted thereon. Probably the most strenuous of distorting forces to which a lawn mower is normally subjected are those incident to operation with only one wheel resting on a supporting surface, as in edging a lawn. In this type of operation the mower must be subjected to a turning moment on the handle to resist the force of gravity and to a second turning moment at right angles to the first, due to the drag on the single wheel which bears the whole load of driving the cutting reel.

The problem of fabricating a lawn mower framework of sufficient rigidity to resist satisfactorily strains incident to ordinary usage is complicated to a remarkable degree by the difficulty of accurate construction of parts within the permissible cost limits.

In this art prior to my invention, it has been customary to accept a certain amount of wrenching in the frame as unavoidable, and then to design the mower to permit substantial flexing of the parts. Flexibility of the finished lawn mower frame has then been regarded as an essential of good design.

I have now found that the problems and disadvantages of the prior art may be overcome by constructing a rigid framework comprising side frame members and a large diameter tie tube which are adapted to be fitted with ordinary manufacturing clearances during assembly and positioning the parts of the lawn mower in proper operative relationship but rigidly secured by the tie tube when the parts have been assembled and adjusted to proper operating relationship. After the parts are in proper relationship, the tie tube and side frame members are rigidly fastened together in an unstrained condition and in a manner illustrated by the embodiment of the invention which is hereinafter described in detail.

The broad invention described and claimed in this application was disclosed and described in connection with an earlier embodiment in my prior copending application, Serial No. 52,757, filed December 4, 1935 now Patent No. 2,183,544.

The invention contemplates the provision of a method of constructing a lawn mower in which the frame is substantially rigid and free from strains introduced by the arrangement and operative connection of parts thereof.

It is a further object of this invention to provide a lawn mower which may be used in any desired manner without substantial distortion of the frame as a result of stresses incident to operation thereof and which overcomes the disadvantages noted above.

It is a further object of this invention to provide a lawn mower in which the various parts can be taken apart and re-assembled with assurance that the preferred adjustment of the frame as established by the factory will be retained.

Other objects and advantages thereof will be clearly understood from a study of the following detailed description of an illustrative embodiment of the invention when considered in connection with the attached drawings, wherein:

Figure 1 illustrates a lawn mower unit embodying the principles of my invention;

Figure 2 is an exploded view of the tie tube in its preferred form;

Figure 3 is an end elevation of the assembled tie tube prepared for attachment to the end frame member;

Figure 4 is a partial elevation of the interior of one end frame member with the tie tube attached thereto;

Figure 5 is a partial section on line 5—5 of Figure 4; and

Figure 6 is a partial section on line 6—6 of Figure 4.

Referring particularly to Fig. 1, the lawn mower unit comprises two side frame members 10, each carrying a wheel 11 which is in contact with the ground during normal operation. The two members 10 are connected and rigidly maintained in desired relationship by a tie tube 12.

The operative parts of the lawn mower unit include a rotary cutting reel 13 journaled in the frame members 10 and connected to the wheels 11 by a gear train or the like (not shown) within the members 10; a bed knife 14, with suitable manual adjusting device 15; and a ground roller 16 attached to the members 10 by an adjustable means 17. Lugs 18 are provided on the frame members 10 for attachment of a suitable handle for propelling the device and the members 10 may be provided with hooks 19 for attachment thereto of a grass catcher.

This invention is concerned primarily with the structure, arrangement and fastening together of the side frame members 10 and the tie tube 12. Each member 10 is formed by any suitable technique as casting, forging or pressing to enclose the transmission connecting the wheels 11 and the axle of rotary cutting reel 13. That transmission may be of any suitable nature such as pinions or chains and sprockets but preferably includes an over running clutch to drive the reel in one direction only. I prefer to form the members 10 by casting to form all the portions thereof in one operation and I have found that die casting with a light weight, low melting point alloy gives a member 10 conforming to the permissible limits of accuracy and having a good appearance with low weight.

The tie tube 12 comprises a metallic tube 20 of large diameter fitted with a collar 21 at each end. The tube 20 is of a diameter sufficiently great to resist distortion. Extremely good results have been obtained in standard sized lawn mowers by the use of a steel tube 20 of 1¾ inches outside diameter and a wall thickness of about 3/32 inch. Other suitable sizes are readily determined for the construction of different sizes of machines.

A region 22 near each end of the tube 20 is roughened as by knurling or checking and the collar 21 is secured to the tube at the region 22. It will be immediately apparent that the collars 21 may be preformed and affixed to the tube 20 by heating and shrinking them in place or by spot welding, but I prefer to cast the same on the tube 20. If the collars are die cast by placing the regions 22 in suitable molds and subsequently pouring therein a low melting point alloy (similar to that preferred for forming the members 10), the collars 21 are easily made reasonably accurate as to form and position on the tube 20.

Each collar 20 is formed with a plurality of keys 23 which lie closely against the surface of tube 20 and a substantially flat shoulder lying in a plane at right angles to the axis of the tube 20. Referring now to Figs. 4 to 6, inclusive, each of the side frame members 10 is formed with an opening 24 to receive the end of tube 20, about which opening are spaced radial recesses 25 corresponding to the keys 23 in shape and position.

Two of the keys 23 are tapped at 26 to receive bolts, and the corresponding recesses 25 are bored to permit passage therethrough of bolts to secure the tie tube 12 to the frame members 10.

The said opening 24 and the recesses 25 are of slightly greater dimensions than the tube 20 and the keys 23 and when assembled the tube and keys have appreciable play in the opening 24 and the recesses 25. These clearances in the parts permits easy assembly without substantial strain due to irregularities in the surfaces of the preformed parts. This feature is very important since it makes possible construction of a mower from parts prepared by ordinary commercial technique without particular attention to a narrow standard of accuracy. A large diameter of the tube and flanges, however, permit bolting securely against such play and the provision of keys and dowel pins as described below assures maintenance of the precise relationship attained by adjustment after assembly.

As noted above, in its preferred embodiment the invention contemplates casting of the frame members 10 and collars 21 so as not to give a perfectly tight fit upon assembly. The method of assembling a lawn mower of parts constructed in the above manner is an important feature of my invention. The bearings (not shown) which carry the reel shaft are mounted in the frame members 10 in any suitable manner and the frame members 10, the reel 13 and the tie tube 12 are then fitted together in such a manner that the reel bearings are unstrained, the tapped keys being matched with the bored recesses. The whole is then placed in an adjustable jig or clamping device which will maintain the reel and frame members in proper relation while the tie tube is secured to the frame members. Having the elements in proper relationship, bores are cut through the previously unbored recesses 25 into the corresponding keys 23. Closely fitting dowels 27 are now driven into the exactly matched bores in recesses 25 and the keys 23; and thereafter bolts 28 are inserted into the tapped keys through the openings in the corresponding recesses and tightened down.

This type of assembly gives a finished structure as rigid and accurate as though each of the parts thereof had been formed and machined to a precision fit, but avoids the expense of such forming and machining.

It will be clearly seen that the structure and relationship of the frame members 10 and tie tube 12 is such that a slight error in closely fitted parts would cause distortion at the reel bearings of such an extent as to result in improper contact of the shearing knives or undue wear of bearings. The present method of assembly, however, makes possible the use of a tie tube which will rigidly maintain the frame members 10 in a predetermined relationship which is suitable for easy, normal operation of the finished mower.

It is to be understood that the embodiment of my invention disclosed here is not intended to be either limiting or exhaustive of the invention but on the other hand is described as illustrative of the concept and advantages thereof with the view to enabling others skilled in the art to practice the same in connection with lawn mowers of different types.

I claim:

1. In a lawn mower of the type having a separable frame, a wheel mounted on each end of said frame, and a cutter mechanism mounted on said frame between said wheels, a frame comprising two spaced side frame members adapted to carry said wheels, and said cutter mechanism, and a tie tube interfitting at each end with one of said side frame members, said tube having a plurality of keys angularly spaced about its periphery, each rigidly and integrally secured to the tube, and said side frame members each having recesses accurately corresponding to said keys, said keys being engaged in said recesses, and removable means for locking said parts rigidly together.

2. In a lawn mower of the type having a frame, a wheel mounted on each end of said frame, and a cutter mechanism mounted on said frame between said wheels, a frame comprising two spaced side frame members adapted to carry said wheels and said cutter mechanism, and a large diameter tie tube inserted at each end thereof into one of said side frame members and having a collar at each end thereof in contact with the said side frame member into which said end is inserted, said collar having four keys projecting therefrom into corresponding recesses in said side frame members, each collar and side frame member being connected by pins passing through said side frame member and respectively into two opposite keys substantially without clearance and by bolts passing through said side frame member with clearance sufficient for manufacturing tolerances and into threaded openings in the other two of said keys.

RICHARD D. CLEMSON.